No. 780,990. Patented January 31, 1905.

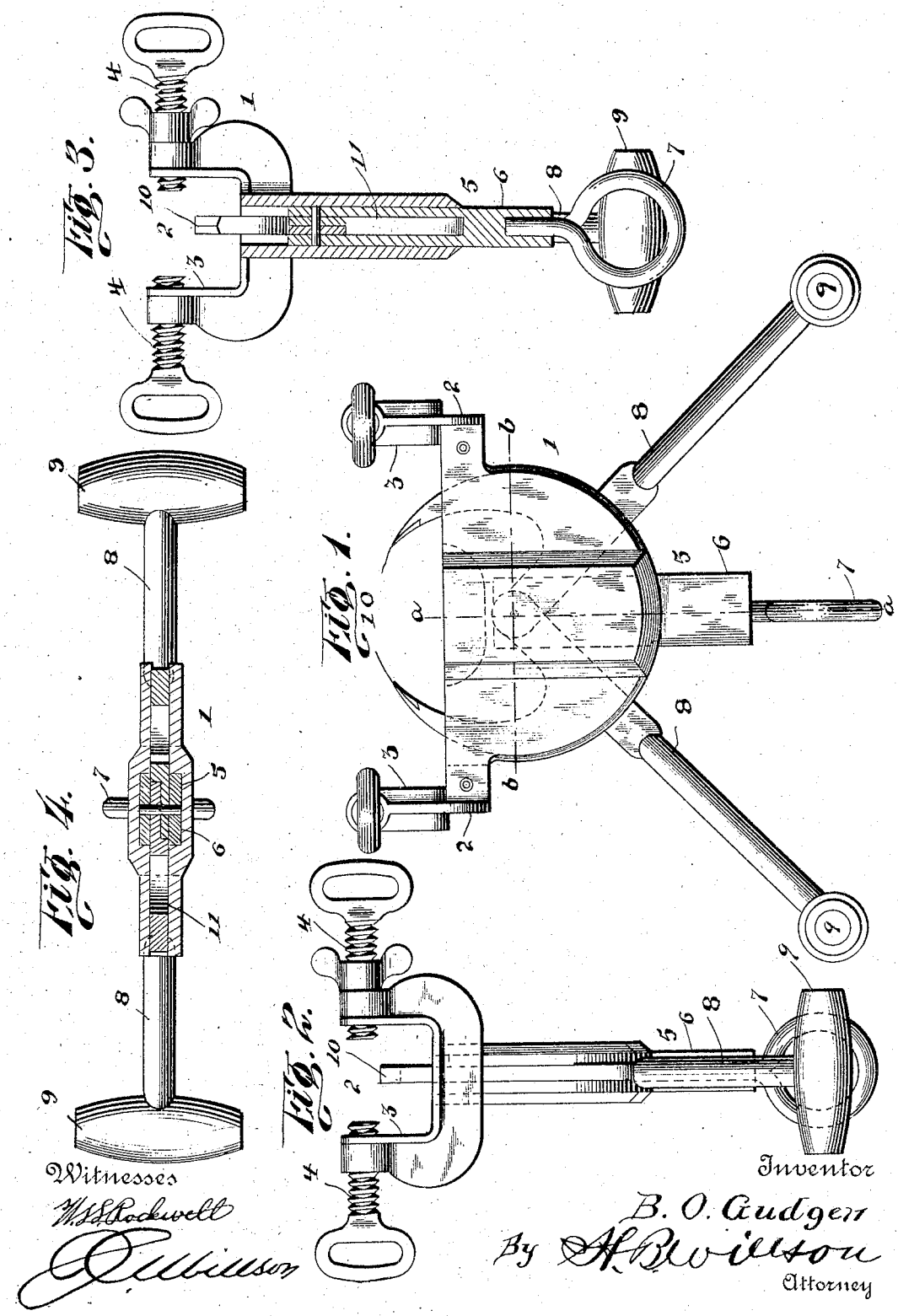

UNITED STATES PATENT OFFICE.

BENJAMIN O. GUDGEN, OF PITTSBURG, KANSAS.

MORTISING DEVICE.

SPECIFICATION forming part of Letters Patent No. 780,990, dated January 31, 1905.

Application filed March 17, 1904. Serial No. 198,622.

*To all whom it may concern:*

Be it known that I, BENJAMIN O. GUDGEN, a citizen of the United States, residing at Pittsburg, in the county of Crawford and State of Kansas, have invented certain new and useful Improvements in Mortising Devices; and I do declare the following to be a full, clear, and exact description of the invention, such as will enable others skilled in the art to which it appertains to make and use the same.

My invention is an improved mortising device adapted for use in cutting segmental mortises in doors and the like for the reception of similarly-shaped mortise locks and butts; and it consists in the construction, combination, and arrangement of devices hereinafter described and claimed.

In the accompanying drawings, Figure 1 is a side elevation of a mortiser embodying my improvements. Fig. 2 is an elevation at right angles to Fig. 1. Fig. 3 is a sectional view taken on the plane indicated by the line $a\ a$ of Fig. 1, and Fig. 4 is a similar view taken on the plane indicated by the line $b\ b$ of Fig. 1.

In the embodiment of my invention I provide a frame or casing 1, which is segmental in shape and is provided with means whereby it may be attached to a door or to a door-frame. Any suitable means may be employed within the scope of my invention to thus secure the frame or casing. I here show U-shaped yokes 2 at the ends of the frame or casing, which project from the flat side 3 thereof and are adapted to receive one edge of a door and are provided with set-screws 4 for clamping the device to the door.

The frame or casing has a guideway 5, which extends transversely therethrough and in which operates a feeder or carrier 6. The latter is provided at its outer end, which projects in rear of the frame or casing, with a handle 7, whereby it may be moved by the pressure of the body of the operator, and to the inner portion of the carrier are pivoted the inner ends of a pair of operating-levers 8, which have handles 9 at their outer ends and are provided at their inner ends with curved bits or cutters 10, which operate in openings 11, with which the frame or casing is provided. It will be understood that by operating the said bits or cutters by means of the levers 8 and handles 9 the same as they approach each other will be caused to make a segmental cut and that by repeatedly thus operating the cutters the same will deepen the cut to form a segmental mortise adapted to receive a similarly-shaped mortise lock or leaf of a butt. By means of the movable carrier 6 the cutters may be fed to the work, as will be understood.

It will be observed by reference to Fig. 1 that the handles of the levers 8 are on opposite sides of the handle 7 of the feeder or carrier, so that the said lever-handles may be readily grasped and operated by the hands of the operator while he presses with his body against the handle 7 of the feeder or carrier in order to feed the disks or cutters to the work.

Having thus described my invention, what I claim, and desire to secure by Letters Patent, is—

1. A device for cutting segmental mortises in doors and door-frames, comprising a frame, a longitudinally-movable feed element carried by the said frame and projecting in rear thereof, segmental cutters pivotally connected together and to the feed element and movable by the latter to project their cutting edges beyond one side of the frame or carrier, said cutters having operating-handles which also project rearwardly from the frame and are disposed on opposite sides of the rearwardly-projecting portion of the feed element, substantially as described.

2. A mortising device of the character described, comprising a frame having a straight edge, U-shaped yokes at the ends of that side of the frame having the straight edge and provided with set-screws for clamping the frame to a door, a longitudinally-movable feed element carried by the frame and projecting in rear thereof, a pair of segmental cutters pivotally connected together and pivoted to and carried by the said feed element, and levers for operating the said cutters, said levers also extending rearwardly from the said frame and being disposed on opposite sides of the rearwardly-projecting portion of the feed element, substantially as described.

In testimony whereof I have hereunto set my hand in presence of two subscribing witnesses.

BENJAMIN O. GUDGEN.

Witnesses:
C. F. GEORGE,
N. S. MARSH.